United States Patent
Todasco et al.

(10) Patent No.: US 12,032,732 B2
(45) Date of Patent: Jul. 9, 2024

(54) AUTOMATED CONFIGURATION OF AUGMENTED AND VIRTUAL REALITY AVATARS FOR USER SPECIFIC BEHAVIORS

(71) Applicant: PAYPAL, INC., San Jose, CA (US)

(72) Inventors: Michael Charles Todasco, Santa Clara, CA (US); Clare Patrice Tandy, Portola Valley, CA (US); Maria Mileder, Campbell, CA (US); Michael Jim Tien Chan, San Jose, CA (US); Vladimir Bacvanski, Portola Valley, CA (US)

(73) Assignee: PAYPAL, INC., San Jose, CA (US)

( * ) Notice: Subject to any disclaimer, the term of this patent is extended or adjusted under 35 U.S.C. 154(b) by 76 days.

(21) Appl. No.: 17/853,704

(22) Filed: Jun. 29, 2022

(65) Prior Publication Data

US 2024/0004456 A1    Jan. 4, 2024

(51) Int. Cl.
*G06F 3/01*    (2006.01)
*G06T 13/40*   (2011.01)

(52) U.S. Cl.
CPC .............. *G06F 3/011* (2013.01); *G06T 13/40* (2013.01)

(58) Field of Classification Search
CPC ............................. G06T 13/40; G06T 19/006
See application file for complete search history.

(56) References Cited

U.S. PATENT DOCUMENTS

| | | | |
|---|---|---|---|
| 10,638,122 B1* | 4/2020 | Rao | G06F 3/04883 |
| 11,062,476 B1 | 7/2021 | Bigontina et al. | |
| 2010/0134485 A1* | 6/2010 | Bhogal | A63F 13/798 |
| | | | 715/706 |
| 2011/0078578 A1 | 3/2011 | Calis | |
| 2011/0292051 A1* | 12/2011 | Nelson | G06V 40/171 |
| | | | 345/467 |
| 2011/0296331 A1* | 12/2011 | Iyer | G06T 17/00 |
| | | | 715/780 |
| 2012/0092328 A1* | 4/2012 | Flaks | G06V 20/10 |
| | | | 345/419 |
| 2012/0106796 A1* | 5/2012 | Jones | G06T 13/40 |
| | | | 345/581 |
| 2015/0379623 A1* | 12/2015 | Gadre | G06Q 30/0643 |
| | | | 705/27.2 |

(Continued)

*Primary Examiner* — Charles Tseng
(74) *Attorney, Agent, or Firm* — .Haynes and Boone, LLP

(57) ABSTRACT

There are provided systems and methods for automated configuration of augmented and virtual reality avatars for user specific behaviors. A user may view a virtual environment and/or capture visual data utilizing a device at a location, where the visual data includes one or more real-world objects, or may interact with a virtual reality environment. An augmented or virtual reality experience may be displayed with virtual objects, graphics, avatars, and/or other virtual visualizations and interactions. A service provider may detect real-time data of the user's behaviors and current events or parameters for the corresponding augmented or virtual reality. Using available avatar customizations and configurations, the service provider may automatically configure avatars for presentation in such digital environments. These customizations may be used to automate avatar configurations and presentations without requiring user inputs and based on real-time data, which may be specifically coded and configured dependent on a digital environment.

20 Claims, 6 Drawing Sheets

(56) References Cited

U.S. PATENT DOCUMENTS

| | | | | |
|---|---|---|---|---|
| 2021/0055838 A1* | 2/2021 | Schimke | ................ | G06V 20/20 |
| 2021/0358222 A1* | 11/2021 | Pejsa | ..................... | G06F 3/0346 |
| 2023/0154113 A1* | 5/2023 | Pratt | .................... | G06Q 30/016 |
| | | | | 345/473 |

* cited by examiner

AUTOMATED CONFIGURATION OF AUGMENTED AND VIRTUAL REALITY AVATARS FOR USER SPECIFIC BEHAVIORS

TECHNICAL FIELD

The present application generally relates to augmented and virtual reality environments and experiences, and more specifically to an augmented or virtual reality experience where avatars are obtainable and may be automatically configured and customized to present user-specific behaviors associated with such environments.

BACKGROUND

Various types of service providers may provide augmented and/or virtual reality experiences for certain uses, include augmented reality (AR) and/or virtual reality (VR) environments where users may interact with other users, objects, and the like through real-world and/or digital experiences. An AR environment may include partially digital environments and overlaying virtual objects over real-world images so that additional data or content may be seen with real-world images and/or environments, where a VR environment may include fully virtual or digital environments, such as metaverses. An AR or VR experience may allow users to interact with other users in a virtual environment, view and/or produce content, interact with avatars for real users and/or artificial intelligence characters, play games, and perform other actions. Additionally, service providers may provide other services to users through AR and/or VR environments, including electronic transaction processing to users. However, avatars and virtual objects in these digital environments may be statically coded and configured, which may not be appropriate for certain environments and/or user activities, may not be entertaining or may otherwise aggravate a user, and/or information may not be properly conveyed to a user. As such, it may be desirable for service providers to automatically configure digitally presented avatars and their corresponding display parameters and code for specific environments and user behaviors.

Figure 1:
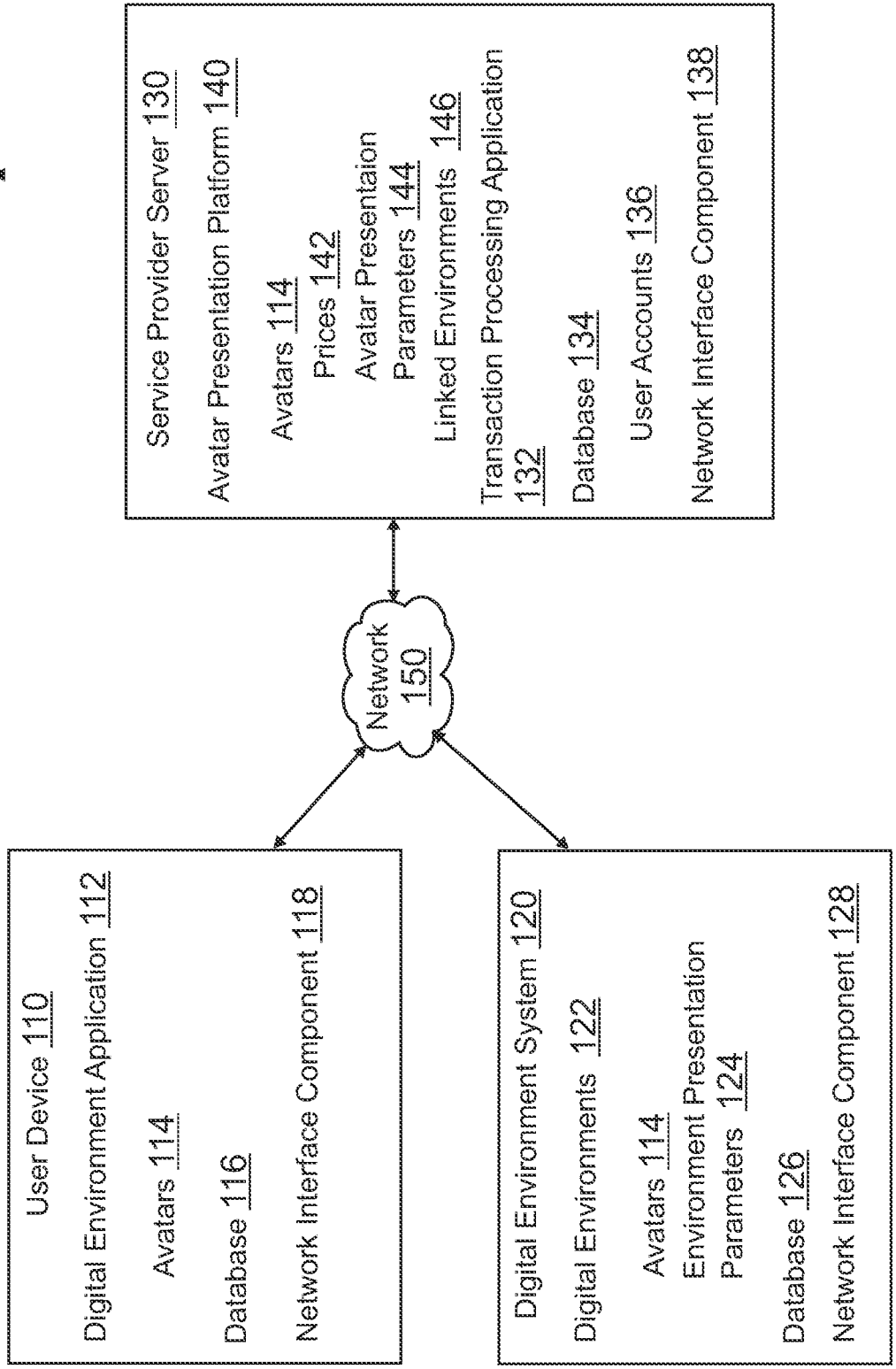
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automated configuration of augmented and virtual reality avatars for user specific behaviors. Systems suitable for practicing methods of the present disclosure are also provided.

According to various embodiments, a user may utilize a communication device in real-world and/or virtual environments to view digital environments, including AR or VR experiences and environments. With AR environments, users may capture images, including video or three-dimensional scans of real-world objects and environments. The user may view real-world objects, which may include static or moveable objects, and one or more AR applications or operations may display, overlay, and/or add virtual images, objects, avatars, graphics, and the like onto the images so that virtual objects and other information may be displayed with, over, next to, and/or associated with the real-world objects. In a VR environment, a user may view an entirely or mostly digital world or environment, such as a metaverse, video game world, online area or location, or the like, where similar virtual objects, including avatars, may be presented to the user and interacted with by different users. An AR and/or VR experience may be experienced by multiple users through different devices based on avatars and other virtual objects and data. While there are differences between AR and VR, use of AR or VR herein applies to both types of experiences and environments, unless otherwise noted.

When viewing the AR or VR environment and experience on or through a computer, wearable computing device, mobile smart phone, portable tablet, or other device, a user may be provided a customized and personal experience where a service provider may provide automated configuration and presentation of avatars in such environments based on user-specific behaviors, available data, and/or environment factors. For example, avatars may correspond to digital representations of users, other creatures, and/or artificial intelligence (AI) controlled persons and/or creatures. Avatars may allow for representing an embodiment, personification, or incarnation person or creature in a virtual space. Conventionally, avatars are initially coded and may be updated with additional virtual objects or settings, such as changes to hair or clothing. In order to provide a more customized and personal experience using avatars that improves the conventional approach, a service provider may automatically configure parameters for avatar presentation, visualization, and/or output by intelligently identifying current user-specific behaviors, as well as environment factors and other available data, to alter avatar output to specific situations in the AR or VR environment. This may be done in real-time and on-the-fly to modify an avatar's configuration at the time of presentation and based on current factors, where the prior model(s) of the avatar may appear different and/or may not be presented. This may allow the avatars to more effectively convey information in real-time to users based on the user's behaviors and factors of the real and/or digital environment, which allows personalized interactions with avatars and AR or VR environments.

In order to interact with an AR or VR experience and environment with avatars, such as to purchase, modify, or otherwise configure avatars and avatar presentations in different digital environments, a user may create an account with a service provider. The user may be required to provide personal or other identification information to establish the account, such as a name, address, and/or other information. The user may also be required to provide financial information, including payment cards (e.g., credit/debit cards), bank account information, gift cards, and/or benefits/incentives, which may be utilized to provide payments or otherwise engage in processing of another transaction associated with the AR or VR environment. In order to create an account, the user may be required to select an account name and/or provide authentication credentials, such as a password, personal identification number (PIN), security questions, and/or other authentication information. The service provider may utilize such information to create the account for the user and provide the user with a digital wallet to the user that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted. The account may also include a device identifier or other contact information for the user so that the user may be contacted to complete a transaction for an item tagged in an AR experience or environment.

Once an account is created, the account may be accessed through a web browser from a website of the service provider and/or a dedicated application of the service provider, such as a mobile smart phone application. The application (or website) may be associated with a payment provider, such as PayPal® or other online payment provider service, which may provide payment services. The application may execute on the computing device for a user and may provide various functionalities and processes to the user. For example, a user may utilize the account through the website or a device application that allows for viewing of an AR or VR environment, where avatars may be placed, engaged with, and/or configured. This configuration may be done automatically, and in real-time, based on current data, user behaviors, environments, and the like, as discussed herein.

With AR environments or experiences, a user may utilize a communication device to capture visual content or other data including a representation of one or more real-world users, creatures, objects, or other like items and things. Image, video, or other audiovisual data at a real-world location may capture a representation of a user, creature, or object within a real-world environment. The user's communication device may include a camera, microphone, or other input device that may be used to capture visual data of a real-world scene that includes the corresponding items or things, such as an image or video of the object as well as other nearby objects in the real-world environment. In order to identify things within the environment, various visual data captured by the camera of the device may be used. Within an image or video of the real-world environment, the representations, locations, and visual data of object may be used to determine identifying characteristics, marks, or other data of the object that identifies real-world objects and allows for outputting and displaying digital objects and assets, including avatars, in an AR environment recreation of the real-world environment.

This may utilize image processing and/or object recognition process to identify the environment and/or corresponding real-world things. For example, this may be done through comparison of the captured data to other images/video and/or analysis of the data using known item features, landmarks, or other identifying data points. Object feature data may also be extracted, which may include distances between signifying points or points of interest in the visual data. Depth or width of these identifying points or other image landmarks may be extracted and processed, as well as a size relative to other features in the visual data. Other data points may also be determined in the visual data, which may include other features of note. The AR experience may then allow for configuration of size, scaling, and other presentation and output parameters for AR assets, such as digital avatars, within the AR environment.

VR environments and experiences may include entirely digital and/or mainly digital environments, such as metaverses. In general, a metaverse may refer to a virtual world, such as a three-dimensional (3D) virtual world, where users may interact, engage with other users and/or objects, purchase and/or claim objects, virtual real-estate, and the like, or otherwise perform virtual interactions within a virtual and/or online space or world. These interactions may be further performed and/or facilitated through the use of virtual and/or augmented realities, including headsets, wearables, augmented reality displays, and the like. Some metaverses may include virtual worlds and/or may interact with real-world environments. Other VR environments may include video game environments and worlds, online platforms and exchanges for interacting with other users and/or bots (e.g., AI characters) in a digital environment, chat platforms that may provide digital environments and/or avatars for communication, and the like. With VR environments, user may view, may utilize or interact with, or may otherwise indicate an interaction or interest with avatars. The interactions may occur at a current time, at a past time, and/or over a time period including multiple interactions.

The service provider may provide a marketplace to design, record, alter, and sell avatars to different users for use with these AR and/or VR environments. Avatars may be associated with avatar appearance, visualization, and/or characterization, including visual appearance, voices or sounds, speech patterns (including language, lines or euphemisms, tones, formal or slang usage, etc.), and the like. This may also, in more advanced AR or VR experiences, include character traits associated with tactile feel, smells, or other data capable of being conveys by a sense. Each avatar may also have different appearances, motions (e.g., dances, emotes, etc.), and the like. For each avatar, a corresponding price may be set for the avatar, as well as their corresponding purchasable features, where prices may be real-time adjusted based on use, arbitrage opportunities, social measures of the avatar or feature, feature usage and/or purchase patterns, or the like, where the online digital marketplace may settle purchases and prices. Further, the marketplace may allow for creation and use of avatars of certain users, performance of certain actions (e.g., dances), face meshing with other avatars or images of real-world users, and the like. For example, a user may establish an avatar of themselves performing a dance, which may be purchasable, such as the user's avatar performing the dance. In some embodiments, the online digital marketplace and/or service provider may allow memberships for users to cycle through avatars of interest and/or based on situations. This allow avatars to be selected and parameters for usage configured via the marketplace of the service provider.

Based on the available, purchased, and/or configured avatars, the service provider may then display and alter avatars in different AR and VR environments for different users and based on different user behaviors and factors or parameters for the corresponding environments. For example, an avatar may be used to display or alter another user's likeness and/or avatar, as well as display new avatars and/or those avatars associated with displaying data, conveying information, or otherwise outputting communications and avatar presence to a user viewing the AR or VR environment. Thus, avatars available to a user may be used in different AR or VR experiences and environments, which may further be altered and configured for presentation (e.g., visualizations, communications, motions including dances or emotes, etc.) based on actions the user is performing or other user behaviors, user biometrics or current emotions and states, events and occurrences in the AR or VR environment, communications or other data being related or presented in the environment, and the like. These configurations may be performed automatically by the service provider based on these input user behaviors and/or environment factors. Avatars may also be automatically configured without purchases by user based on the context of the user's behavior (e.g., demographics, personal info, age, survey results, etc.), as well and the context of the AR or VR environment. For example, avatar presentation may be configured, altered, and output in the following scenarios.

In one example, avatars in AR and/or VR environments may be used to inform users of line queueing with remote or other users, as well as line and route influencing to direct users to specific lines. In some embodiments, a user may visit a real-world or digital location, where multiple users may be remotely queued for purchase of items or services. This may include restaurants that have online or digital orders or amusement parks where users may have reserved line spots or return times, where it may not be apparent in a real-world environment being viewed in an AR or to another user's avatar in VR having hidden or remote avatars, that such avatars are actually queued and/or in line before the user. This may allow a user to assess line length in a more visual manner. Further, avatars may be used to direct users to different lines and/or sub-locations within an area by showing crowding, movement, or the like. The avatars may also be used to direct, either by motions, audio or communications, and the like when addressing or handling line queueing.

Further, line queueing and/or location/line direction influencing may be addressed by utilizing avatars of higher interest or preference to users. For example, a user may prefer to view one of their selected avatars or a preferred avatar in a particular line and/or guiding the user to an area, which may be used to present the corresponding avatar in the AR or VR environment and/or animate, vocalize, or otherwise present the avatar. Avatars may also be customized and dynamically presented to users that are of more interest to the user in particular lines to entice the user to that line and/or direct the user, such as celebrities of interest to the user, influencers the user follows, family and/or friend avatars or avatars generated from images of such family/friends (including face-mashing technology to generate avatar facial images of celebrities, influencers, and/or family/friends), and the like. This may be done by increasing an attractiveness or compatibility of avatars to the user in order to influence a user's decision on a line and/or route through a location.

Avatars may also be used to provide information and/or news to users in a better, more friendly, and/or more comforting manner. For example, the user may have avatars of preference, or preferences for certain persons, creatures, or other personalities, that may be provided as avatars when informing a user of information. These avatars may be more pleasing to the user, and therefore may be used to communicate information, present advertisements, guide a user, and/or convey messages to the user in an AR or VR environment. In some embodiments, this may be done during stressful times and/or to deliver stressful or bad news. For example, if at an airport and viewing an AR environment, the user's flight may be delayed. An avatar of a user's favorite comedian or comedienne may be customized and configured automatically to present the delay news to the user in the AR environment, such as using voice modulation or voice synthesis to use the corresponding voice, as well as tell a joke or otherwise provide entertainment to the user. Further, the avatar may be automatically configured based on what the user is doing and/or what is occurring in the environment. For example, in a VR environment, such as a metaverse, an event may occur where a corresponding avatar of preference to the user may be automatically configured to identify the user's current behavior in the VR environment and notify the user of the current event and options to join, view, etc.

In some embodiments, advertising may be altered using automatically configured avatars of interest to the user (influencers, celebrities, purchased or acquired avatars that may be characters, fantastical, or creatures, etc.). For example, the user may set or have preferences for certain avatars that are more pleasing, where a merchant, advertiser, brand, or the like may utilize such preferences to advertise to a user and/or guide the user to certain products, as well as guide the user away from other products including those that may be damaging or bad (specifically identified by the user, identified by the system based on known user traits, or more general non-beneficial products) for a user (e.g., unhealthy foods for a person with health issues, alcohol for a recovering addict, etc.). A brand may also automatically select and/or intelligently provide avatars to recommend items and/or services in a real-world, AR, and/or VR environment, which may be based on user interests. Further, the avatar may be presented as one or more (e.g., face-mashing technique) of the user's contacts, social connects, friends/family, or the like. When advertising to the user, the avatar may be configured and/or displayed based on a context of the user's behaviors, such as if the user is browsing, shopping, or performing a non-shopping action. Further, when configuring the avatars to present to the user in one or more users, the merchant, storefront owner, owner or controller of a location or environment in AR or VR, or the like may select avatars that may be presented to improve an image or appeal of that location or environment. Thus, the real or virtual location and/or proprietor for the location may select and/or approve avatar configurations in AR and VR environments or experiences.

Thus, automatically configured and customized avatars that are user-specific and based on user behaviors and/or AR/VR environments may be used for behavior creation and/or inducement. Users may be guided to certain routes, items or services, lines, advertisement, or the like in a pleasing and more relatable manner. This may increase likelihood of customer conversion and/or provide guidance and information in a more pleasing manner in AR and VR environments. Further, the avatars may be used to induce other behaviors, such as for tips for power consumption, water conservation, and/or health or safety issues. For example, an avatar configured for a user's behavior and home or other location may automatically be configured and output to provide advice on how to conserve water/power. The avatars may also update and/or provide emergency information, information about users in different areas and/or how to increase safety or comfort, and other information that may be useful to a user when viewing an AR or VR environment and have a corresponding real-world location or environment. However, to avoid overcommunications, avatars may be limited in what is presented based on emergency levels of the potential issue.

In this manner, an improved AR and/or VR environment may be provided with automatically configured and presented digital avatars that are user-specific. These avatars may be provided in real-time and configured from streaming data, captured biometrics and reactions, and the like. This allows for improved experiences with digital environments and better device display of data through automatically configured avatars. Further, a service provider may facilitate digital avatar acquisition and customization, which may be used for automating the configuration and output of digital avatars in such AR and VR environments.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a digital environment system 120, and a service provider server 130 in communication over a network 150. A user (not shown) may utilize user device 110 to utilize the various features available with user device 110, which may include processes and/or applications associated with service provider server 130 to view an AR or VR experience provided by one or more AR or VR applications and view, interact with, and/or request configuration of avatars. The user may utilize user device 110 to interact with an AR/VR environment and virtual objects, characters, and the like. These virtual characters may include avatars, where the avatars are made available and/or automatically configured using service provider server 130.

User device 110, digital environment system 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 130. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 1 contains a digital environment application 112, a database 116, and a network interface component 118. Digital environment application 112 may correspond to executable processes, procedures, and/or applications with associated hardware. In other embodiments, user device 110 may include additional or different modules having specialized hardware and/or software as required.

Digital environment application 112 may correspond to one or more processes to execute software modules and associated devices of user device 110 to provide an AR or VR scene or video of a digital environment, including avatars 114 presented, visualized, and/or characterized, such as through motion, speech, sounds, or the like in the environment. In this regard, digital environment application 112 may correspond to specialized hardware and/or software utilized by a user of user device 110 that may receive and present digital environment data for the AR/VR environment, and may present that data via one or more display components, audio outputs, or the like and accept input to interact with the avatar, move through the environment, and/or otherwise perform actions in the environment. For AR environments, digital environment application 112 may be used to receive, capture, and/or record video data, including audiovisual data that includes audio data. Digital environment application 112 may utilize a camera or other optical/visual data capturing device of user device 110. For example, the visual data capture device may correspond to at least on optical or visual capture device of user device 110 enabling a user associated with user device 110 to capture or record images, including still and/or video images. Input devices may correspond to a digital camera on user device 110 (e.g., incorporated in user device 110 such as a mobile phone's digital camera in a traditional camera orientation and/or a forward facing camera orientation that captures one or more users as they use and view a display screen of user device 110) or associated with user device 110 (e.g., connected to user device 110 but incorporated within a body or structure of user device 110), or may more generally correspond to any device capable of capturing or recording an image, video, or other digital media data.

As a digital camera, input devices may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of input devices may include various features, such as zoom, flash, focus correction, shutter speed controls, or other various features usable to capture one or more images or videos of the user and/or other users or objects. Input devices may include other media capture components, including a microphone to capture audio data. Input devices may further display a preview and/or captured image to the user through another device of user device 110, such as a viewfinder, screen (e.g., mobile phone touch screen, tablet touch screen, and/or personal computer monitor), or other display. Input devices may interface with one or more applications of user device 110 to capture visual media data, such as images/videos, and may output an AR of the captured visual media data that includes avatars 114 configured by service provider server 130 and placed in AR/VR environments provided by digital environment system 120.

Digital environment application 112 may be used to display received audiovisual data for an AR and/or VR environment and/or experience from digital environment system 120. This data may include presentation data of automatically configured avatars 114 by service provider server 130 when interacting with digital environment system 120 for avatar customization and output in AR/VR environments. The data may be output to display an AR or VR environment that includes avatars 114 that may provide information, items, and/or services to the user of user device 110, as well as otherwise interact with the user. The avatars 114 from the data presented in the AR or VR environment may be customized and configured for the user associated with user device 110. Thus, the avatars 114 may be specific to the user, the user's behaviors, the AR/VR environment, and/or parameters associated with user device 110. Thereafter, the user may utilize user device 110 to interact with the avatars 114 and/or receive information, services, and the like from the avatars 114.

In some embodiments, digital environment application 112 may include and/or provide transaction processing services, for example, through one or more processes that provide an interface to permit the user to enter input and other data for transaction information, for example, through an input device (e.g., touch screen with a graphical user interface, keypad/keyboard, mouse, etc.) and/or through a data capture device (e.g., camera, other optical device, etc.). Such information may be used to purchase and/or alter avatars 114 that are output during virtual graphic and avatar generation and/or presentation in an AR/VR environment. Digital environment application 112 may be utilized to select payment instrument(s) for use with a marketplace of avatars 114 and avatar configurations. As discussed herein, digital environment application 112 may utilize user financial information, such as credit card data, bank account data, or other funding source data, as a payment instrument when providing payment information, including an account with service provider server 130. For example, digital environment application 112 may utilize a digital wallet associated with an account with a payment provider, such as service provider server 130, as the payment instrument, for example, through accessing a digital wallet or account of a user with service provider server 130 through entry of authentication credentials and/or by providing a data token that allows for processing using the account. Digital environment application 112 may also be used to receive a receipt or other information based on placing or redeeming funds with the AR experience.

In various embodiments, user device 110 includes other applications as may be desired in particular embodiments to provide features to user device 110. For example, the other applications may include security applications for implementing client-side security features, programmatic client applications for interfacing with appropriate application programming interfaces (APIs) over network 150, or other types of applications. The other applications may also include email, texting, voice and IM applications that allow a user to send and receive emails, calls, texts, and other notifications through network 150. In various embodiments, the other applications may include financial applications, such as banking applications. The other applications may also include other location detection applications, which may be used to determine a location for the user, such as a mapping, compass, and/or GPS application, which can include a specialized GPS receiver that obtains location information for user device 110 and provide the location for a particular object, scene, or other data associated with an AR experience. The other applications may include social networking applications, media viewing, and/or merchant applications. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of user device 110, such as display devices capable of displaying information to users and other output devices, including speakers, which may display an AR experience to a user.

User device 110 may further include database 116 stored in a transitory and/or non-transitory memory of user device 110, which may store various applications and data and be utilized during execution of various modules of user device 110. Thus, database 116 may include, for example, identifiers such as operating system registry entries, cookies associated with digital environment application 112, identifiers associated with hardware of user device 110, or other appropriate identifiers, such as identifiers used for payment/user/device authentication or identification, which may be communicated as identifying user device 110 to service provider server 130. In various embodiments, database 116 may store real-world images and/or AR/VR data for a digital environment, which may include data for avatar configuration and customization.

User device 110 includes at least one network interface component 118 adapted to communicate with digital environment system 120, service provider server 130, and/or another device or server for electronic transaction processing. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices. In some embodiments, communication device 110 may also communicate directly with nearby devices (e.g., merchant device 130) using short range communications, such as Bluetooth Low Energy, LTE Direct, WiFi, radio frequency, infrared, Bluetooth, and near field communications.

Digital environment system 120 may be maintained, for example, by an online service provider, which may provide AR/VR environments, experiences, and/or services allowing users to interact with other users, including interacting with avatars of other users and/or AR/VR characters. In this regard, digital environment system 120 includes one or more processing applications which may be configured to interact with user device 110, service provider server 130, and/or another device/server to facilitate an AR/VR experience for avatar presentation, configuration, and customization that is user specific. In one example, digital environment system 120 may be incorporated with service provider server 130, and therefore may be provided by PAYPAL®, Inc. of San Jose, CA, USA. However, in other embodiments, digital environment system 120 may be maintained by or include another service provider, which may provide AR/VR experiences to users, which may be connected with and configured by service provider server 130.

Digital environment system 120 of FIG. 1 includes digital environments 122, a database 126, and a network interface component 128. Digital environments 122 may be provided by executable processes, procedures, and/or applications with associated hardware. In other embodiments, digital environment system 120 may include additional or different applications and/or modules having specialized hardware and/or software as required.

Digital environments 122 may correspond to one or more AR and/or VR environments and/or experiences that are provided by one or more processes executed by software modules and associated specialized hardware of digital environment system 120. In this regard, digital environments 122 may be provided by specialized hardware and/or software that is configured to generate, maintain, update, and output (e.g., by streaming data, providing an online and/or application accessible "world" or environment, transmitting or downloading/uploading data for the digital environment, etc.) one or more AR and/or VR environments that allow users to interact with virtual objects, avatars, services, and other virtual things. An AR environment provided by digital environments 122 may correspond to one or more virtual avatars, virtual objects, or the like that may be overlaid on real-world captured images and/or video associated with a location of user device 110 and/or being captured by user device 110. A VR environment may correspond to a metaverse, video game world, online communication and/or activity platform, and the like, where a digital world or location may be generated and output to allow users to interact with avatars and customize or configure avatars. Digital environments 122 may therefore provide avatars in such digital environments, where the avatars may be user-specific and configured specifically for the user's behaviors and the corresponding digital environment.

Additionally, digital environment system 120 includes database 126. Users may link to their respective avatars, accounts, user identifiers, personalized AR/VR environment presentations, metaverses, or the like via a username, identifier, password, multifactor authentication key, user or device identifier, or the like. Thus, when an identifier, login, authentication credential or the like is transmitted to digital environment system 120, e.g., from user device 110, one or more digital environment presentations may be identified. Database 126 may store AR/VR data for an AR/VR experience that may be displayed to other devices, including information for configured avatars based on parameters established by service provider server 130, which may occur in conjunction with data from user device 110.

In various embodiments, digital environment system 120 includes at least one network interface component 128 adapted to communicate user device 110, service provider server 130, and/or another device or server over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Service provider server 130 may be maintained, for example, by an online service provider, which may provide transaction processing and payment services, as well as AR services for placing funds within an AR environment so that other users may retrieve those funds. In this regard, service provider server 130 includes one or more processing applications which may be configured to interact with user device 110, and/or another device/server to facilitate an AR experience for object purchasing, accessing, or interacting. In one example, service provider server 130 may be provided by PAYPAL®, Inc. of San Jose, CA, USA. However, in other embodiments, service provider server 130 may be maintained by or include another type of service provider, which may provide connection services to a plurality of users.

Service provider server 130 of FIG. 1 includes an avatar presentation platform 140, a transaction processing application 132, a database 134, and a network interface component 138. Avatar presentation platform 140 and transaction processing application 132 may correspond to executable processes, procedures, and/or applications with associated hardware. In other embodiments, service provider server 130 may include additional or different modules having specialized hardware and/or software as required.

Avatar presentation platform 140 may correspond to one or more processes to execute software modules and associated specialized hardware of service provider server 130 to provide a digital marketplace for avatar acquisition for AR and VR environments and experiences. Avatar presentation platform 140 may further configure avatars in a user-specific manner automatically and in real-time without requiring a user to input configurations, change avatar configurations and/or outputs (e.g., using a dashboard, panel, or preferences), or otherwise being required to perform an action or be aware that the avatar is being configured in the corresponding AR/VR environment. In this regard, avatar presentation platform 140 may correspond to specialized hardware and/or software to provide an online digital marketplace that allows purchase, acquisition, trading, uploading/downloading of, and/or creating of avatars 114. In some embodiments, avatar presentation platform 140 may allow for users to create and/or upload digital avatars, which may be of the user, fantastical and/or designed by the user, of creatures, or the like. The users may also configure avatar presentation parameters 114 for actions, speech, sounds, and the like of an uploaded and/or available avatar, and may make available for purchase. The user may set prices 142 and/or the digital marketplace of avatar presentation platform 140 may establish prices 142 based on demand, use, social rating, rarity, and the like. Such prices 142 may be dynamic and may be influenced based on market parameters and demand. Users may purchase and/or acquire (e.g., download free ones of avatars 114 and/or avatar presentation parameters 144, such as motions (e.g., a dance), voice, appearance, clothing, etc.). Subscription services may also be provided to provide access to multiple avatars and/or services, including on a rotating basis. Once purchased, such avatars may be utilized for automatic avatar configuration and presentation to users in AR/VR provided by digital environment system 120 and/or other AR/VR systems.

For example, a user associated with user device 110 may have a set of avatars 114 and avatar configurations (e.g., motions, speech or sounds, appearance, clothing or accessories, etc.), either purchased, uploaded, or otherwise acquired, established with avatar presentation platform 140.

The ones of avatars 114 for the user may then be set with linked environments 146 for one or more AR or VR environments that the user would like to utilize those of avatars 114 in when interacting with and/or in such environments. Linked environments 146 may then be monitored to detected interactions with and/or use of those AR/VR environments by the user using user device 110 in order to determine to automatically configure one or more of avatars 114 for the corresponding environment and user-specific behaviors of the user, which creates an automatically and real-time configured avatar for that corresponding environment in a user-specific manner. Thus, avatar configuration may be automated based on available ones of avatars 114, avatar presentation parameters 144, user behaviors, AR/VR environmental factors, and the like. Using the avatar data and/or visualization and presentation data, as well as data for the AR/VR environment and user behaviors, avatar presentation platform 140 may then automatically configure the avatars and generate avatar data for parameters needed for avatar display that are changed for the specific user behaviors and environment.

Once configured, the automatically configured avatars are output to digital environment system 120 using the avatar data. Service provider server 130 may transmit the avatar data to digital environment system 120 for presentation in one or more of linked environments 146. Thereafter, digital environment system 120 may provide these configured and customized avatars to corresponding users targeted and/or specified for the configured avatars in a corresponding AR or VR environment while the user views the environment. This may include animating the avatar, having the avatar communicate information, or otherwise utilize the avatar with the user and/or user's avatar in the corresponding digital environment.

Transaction processing application 132 may correspond to one or more processes to execute modules and associated specialized hardware of service provider server 130 to process a transaction, including purchase and/or sale of avatars and/or avatar configurations or parameters (e.g., avatar presentation parameters 144 based on prices 142). In this regard, transaction processing application 132 may correspond to specialized hardware and/or software used by a user associated with user device 110 to establish a payment account with transaction processing application 132 by providing personal and/or financial information to service provider server 130 and selecting authentication credentials. In various embodiments, the financial information may include payment instrument information, such as account/ card numbers and information. The account may be used to send and receive payments, including those payments that may be utilized for automated avatar configuration and presentation in an AR experience for a real-world environment or a VR experience for a metaverse, video game world, or other mainly digital environment. The payment account may be accessed and/or used through a browser application and/or dedicated payment application executed by user device 110, such as digital environment application 112 or another payment and/or digital wallet application. Transaction processing application 132 may process a payment and may provide a transaction history to user device 110 and/or another user's device or account for transaction authorization, approval, or denial of the transaction for placement and/or release of the funds, including transfer of the funds between accounts.

In various embodiments, service provider server 130 includes other applications as may be desired in particular embodiments to provide features to service provider server 130. For example, the other applications may include security applications for implementing server-side security features, programmatic client applications for interfacing with appropriate application programming interfaces (APIs) over network 150, or other types of applications. The other applications may contain software programs, executable by a processor, including a graphical user interface (GUI), configured to provide an interface to the user when accessing service provider server 130, where the user or other users may interact with the GUI to more easily view and communicate information. In various embodiments, the other applications may include connection and/or communication applications, which may be utilized to communicate information to over network 150.

Additionally, service provider server 130 includes database 134. A user and/or merchant associated with avatar presentation may establish one or more digital wallets and/or accounts with service provider server 130. Digital wallets and/or accounts in database 134 may include user information, such as name, address, birthdate, payment instruments/ funding sources, additional user financial information, user preferences, and/or other desired user data. Users may link to their respective digital wallets and/or payment accounts through an account, user, merchant, and/or device identifier. Thus, when an identifier is transmitted to service provider server 130, e.g., from user device 110, one or more digital wallets and/or payment accounts belonging to the users may be found. Database 134 may store AR/VR data for an AR/VR experience that may be utilized to configure avatars, as well as avatar data and display parameters for presentation and configuration of the avatar in different environments and based on different user behaviors. Further, database 134 may store user-specific display parameters of avatars including current user data and/or behaviors needed to configure avatar display.

In various embodiments, service provider server 130 includes at least one network interface component 138 adapted to communicate with user device 110, digital environment system 120 and/or another device or server over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
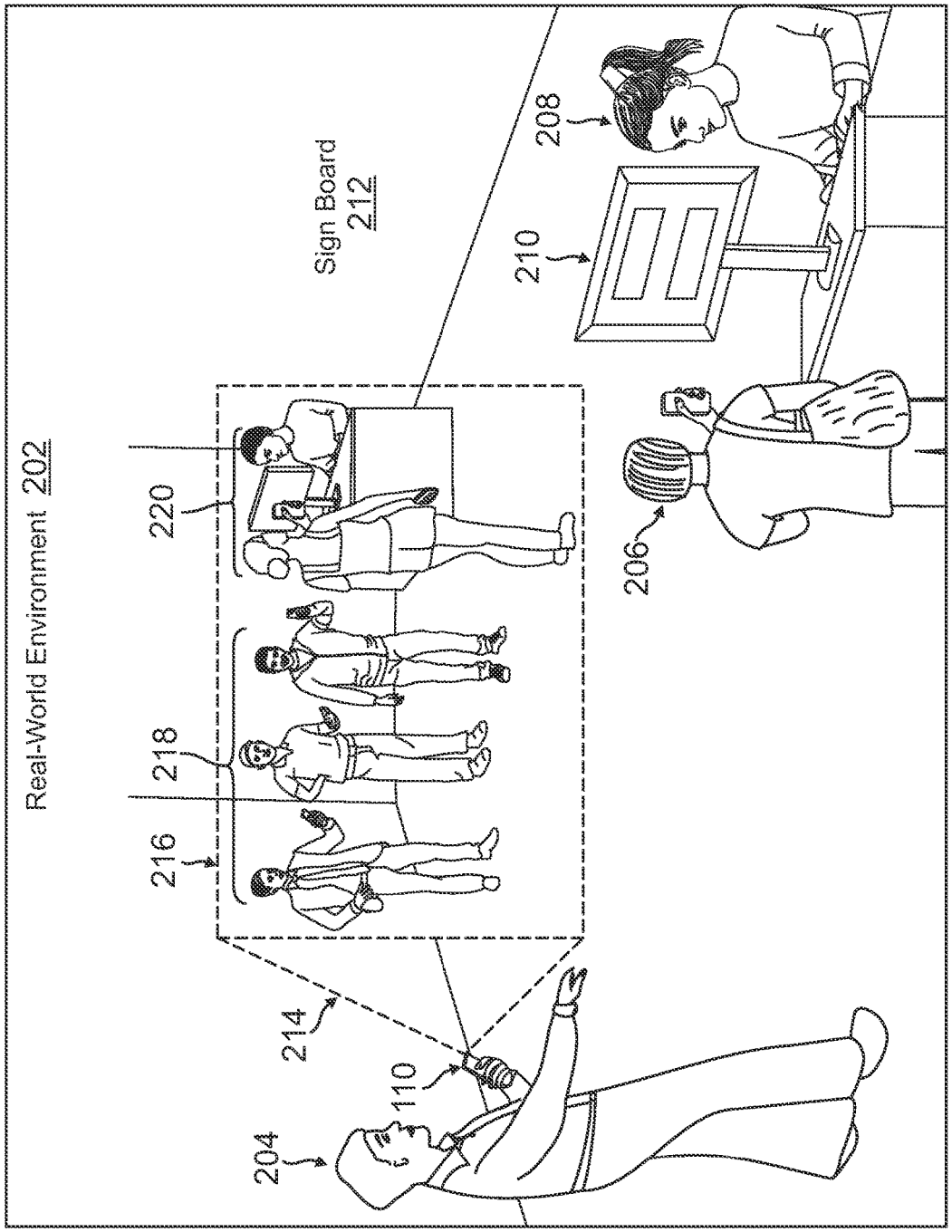
FIG. 2A is an exemplary environment having a communication device displaying an augmented reality environment having automatically configured avatars associated with a real-world environment, user-specific behaviors, and avatar presentation parameters, according to an embodiment.

FIG. 2A is an exemplary environment 200a having a communication device displaying an augmented reality environment having automatically configured avatars associated with a real-world environment, user-specific behaviors, and avatar presentation parameters, according to an embodiment. Environment 200a of FIG. 2A includes a real-world environment 202 that may be captured and then displayed with an AR environment 216 by user device 110, for example, corresponding generally to an interface output through the described features, processes, and components of digital environment application 112 of user device 110 in system 100 of FIG. 1. In this regard, a user utilizing user device 110 may view AR environment 216 on user device 110, where AR environment 216 may display one or more digital avatars in order to convey additional information associated with real-world environment 202.

In this regard, AR environment 216 includes an AR display of real-world environment 202 that may then be displayed with AR data for an AR application and experience on user device 110. For example, AR environment 216 may display real-world data for an environment, as well as virtual graphics and avatars displayed with, overlaid, or added to visual data for real-world environment 216 when AR environment 216 is output by user device 110. Those avatars, virtual graphics, objects, or indicators may correspond to additional information and visuals that enhance real-world environments in the AR experience. In this regard, a user 204 may utilize user device 110 to capture real-world environment 202 via one or more images and/or videos, and thereafter view AR environment 216 via one or more output components that include virtual avatars and objects added to real-world environment 202.

In order to configure and customize avatars and AR environment 216 for user 204, a service provider may obtain information regarding behaviors of user 204 (e.g., is user 204 queueing in a line, attempting to order when viewing a sign board 212, accompany a user 206, attempting to flag a merchant employee 208, or the like). The service provider may also determine any information about real-world environment 202, including a location, location type or merchant type, or other location parameters and information, which may indicate avatars to display in AR environment 216 and how to configure those avatars. Further, any information about other displays of AR environment 216 that may be shared with user 204 may be determined, such as if this is a shared AR environment where other users may interact with user 204 via avatars.

In one example where additional line queueing information may be provided to user 204, user 204 may enter real-world environment 202 and only view user 206 ordering from merchant employee 208, such as by providing an order being entered in merchant device 210 and/or provided using item information from sign board 212. However, merchant device 210 may have a backlog or order list, as well as pending phone calls or online chats, that include many online and/or delivery orders, which may indicate that user 204 may not be served quickly or able to order next. User 204 may view a display 214 (e.g., on an output display screen, such as a smart phone's touch screen interface) of AR environment 216. When configuring avatars for presentation in AR environment 216, the service provider may determine to add avatars 218 in front of the user and shown in line prior to a current order 220 between user 206 and merchant employee 208. This may indicate that user 204 is in a longer line than visually apparent. In order to entertain user 204 and/or allow user 204 to engage with the other users in line, avatars 218 may be specifically configured for user 204 and/or based on behaviors of user 204. For example, avatars 218 may be specifically configured in real-time based on avatars of interest to user 204. If user 204 appears agitated, avatars 218 may attempt to calm or entertain user 204. Avatars 218 may be configured for the other users in line and allow user 204 to ask questions, such as what is best to order or how long they have been waiting. Further, avatars 218 may be configured by the merchant corresponding to real-world environment 202 to make the merchant and/or location appear more attractive, guide user 204 to a particular line or location, and/or provide advertisements of available products in a more attractive manner by using avatars of interest to user 204.

Figure 2B:
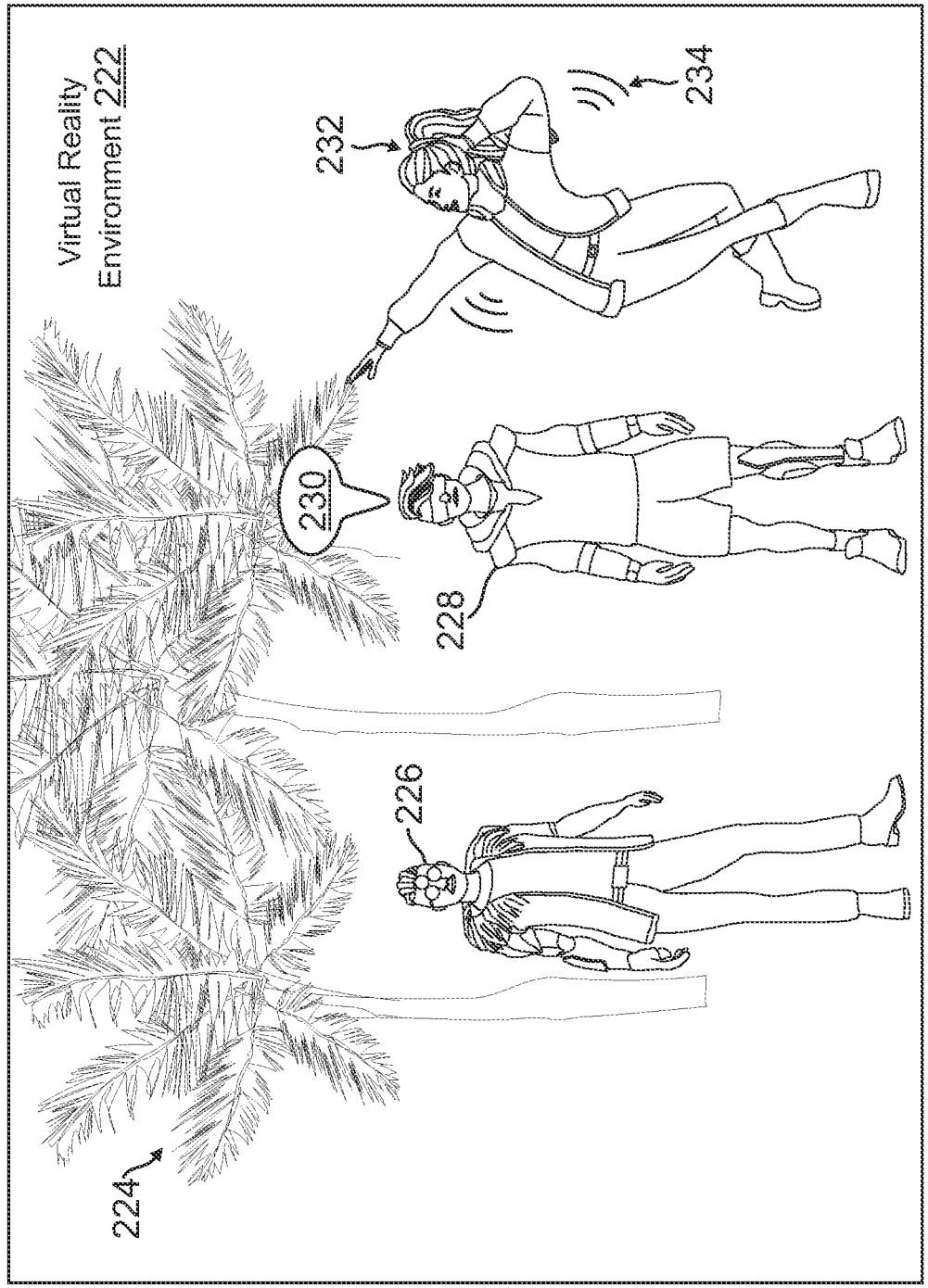
FIG. 2B is an exemplary interface of a communication device displaying a virtual reality environment having automatically configured avatars associated with the virtual reality environment, user-specific behaviors, and avatar presentation parameters, according to an embodiment.

FIG. 2B is an exemplary interface 200*b* of a communication device displaying a virtual reality environment having automatically configured avatars associated with the virtual reality environment, user-specific behaviors, and avatar presentation parameters, according to an embodiment. Interface 200*b* of FIG. 2B includes a VR environment 222 that may be displayed by user device 110, for example, corresponding generally to an interface output through the described features, processes, and components of digital environment application 112 of user device 110 in system 100 of FIG. 1. In this regard, a user utilizing user device 110 may view virtual reality environment 222 on user device 110, where virtual reality environment 222 may display one or more configured and customized digital avatars specifically based on user behaviors in virtual reality environment, such as based on user preferences, selections, and/or activities associated with virtual reality environment 222.

In this regard, the user viewing virtual reality environment 222 may view customized avatars that are displayed with VR object 224, such as a location having different VR objects that are interactable and/or viewable (e.g., objects in a metaverse, video game, etc.). A first avatar 226 may be configured with customized outfits and/or appearances based on those purchased and/or obtained by the user. This may cause first avatar 226 to appear different within virtual reality environment, and may also be based on what the user is doing with their corresponding avatar or when engaging with virtual reality environment 222.

Other avatars may also be customized with different presentations, visualizations, vocalizations, and the like based on those selected by the user, the user's behaviors, and/or occurrences within virtual reality environment 222. For example, a second avatar 228 may provide a communication 230 to the user viewing or engaging in virtual reality environment 222, such as a notification, communication from another user, system update or alert, event message, or the like. Virtual reality environment 222 may also be displayed while the user is engaging in events in a real-world environment and may therefore be linked to the real-world environment and provide messages from the real-world environment. In order to make communication 230 more appealable and/or entertaining, second avatar 228 and/or communication 230 may be automatically configured and in real-time during delivery for the user. A third avatar 232 may also be automatically configured to provide a dance 234 specifically selected by the user and/or based on the user's behaviors to be entertaining to the user and/or more appealing. Therefore, third avatar 232 may not normally perform dance 234, but on encountering the user and/or the user's avatar, dance 234 may be performed for the user.

Figure 3:
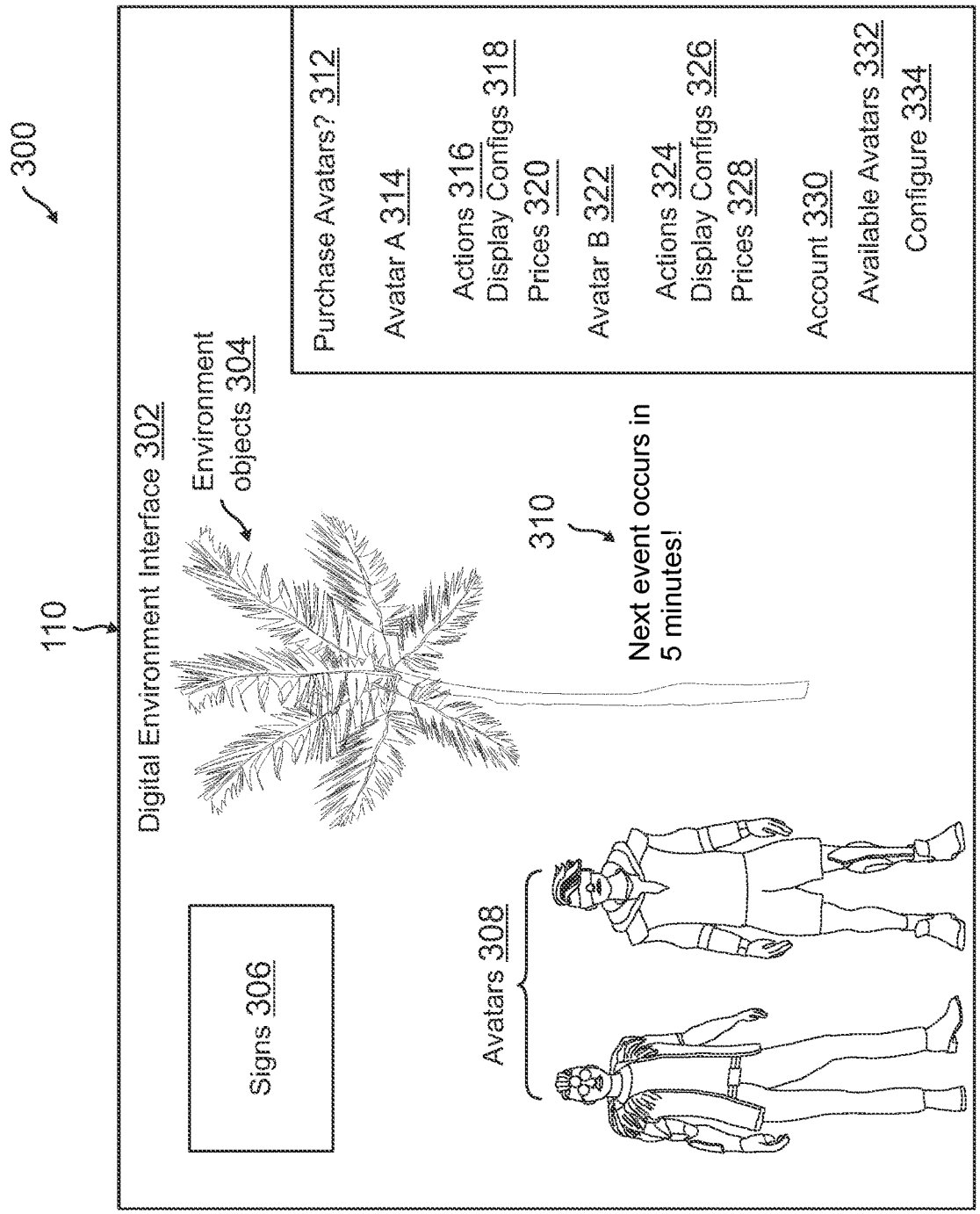
FIG. 3 is an exemplary system environment showing a communication device interacting with an augmented or virtual reality environment to configure avatar presentation and visualization in the environment, according to an embodiment.

FIG. 3 is an exemplary system environment 300 showing a communication device interacting with an augmented or virtual reality environment to configure avatar presentation and visualization in the environment, according to an embodiment. Environment 300 of FIG. 3 includes user device 110 discussed in reference to system 100 of FIG. 1. In this regard, user device 110 may display a digital environment interface 302 corresponding to an AR or VR environment.

User device 110 therefore displays digital environment interface 302, which includes real or virtual objects for environment objects 304 and/or signs 306 corresponding to the AR or VR environment being displayed in digital environment interface 302. Environment objects 304 and signs 306 may be displayed in order to provide objects that may be interacted with in the corresponding real-world or digital environment. Further, avatars 308 may be configured based on the settings for the user (e.g., available avatars and/or avatar preferences) and the user's current behaviors associated with the AR/VR environment shown in digital environment interface 302. Configuring of the avatars may also include configuring of communication 310.

In a side tab or display 312, the user utilizing user device 110 may purchase and configure presentation parameters for avatars 308 and/or other avatars. For example, side tab 312 provides options to purchase an avatar A 314 and an avatar B 322, which may be purchasable using an account 330. Further, avatar A 314 may be associated with additional options, including actions 316 for performance by avatar A 314, display configurations 318 for appearance of avatar A 314 and/or usage of avatar A 314 in different AR or VR environments, and prices 320. Similarly, avatar B 322 may be associated with actions 324, display configurations 326, and prices 328. Side tab 312 may utilize account 330 for purchase of avatar A 314 and/or avatar B 322, as well as configure available avatars 332 using configure option 334.

Figure 4:
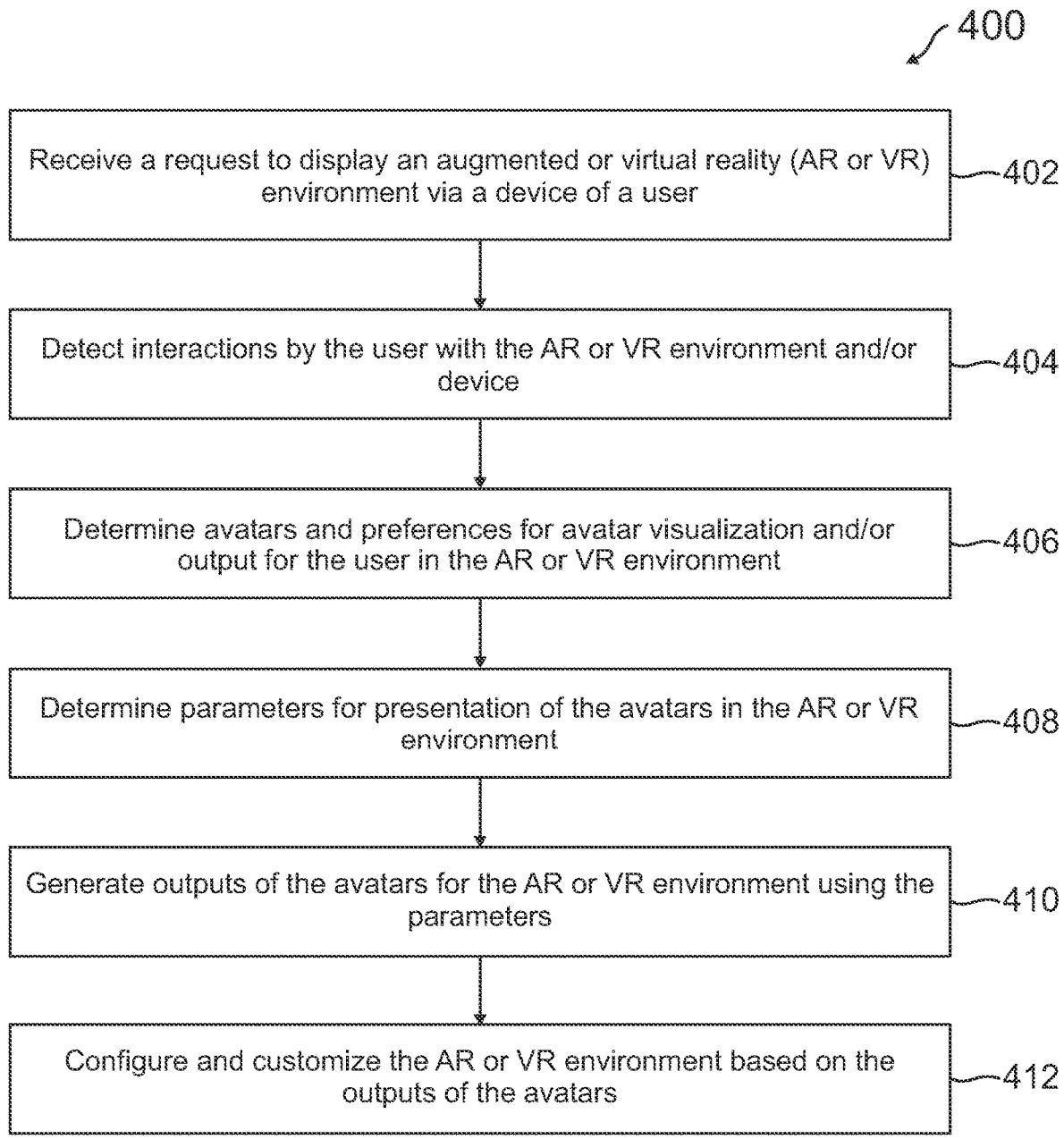
FIG. 4 is a flowchart of an exemplary process for automated configuration of augmented and virtual reality avatars for user specific behaviors, according to an embodiment.

FIG. 4 is a flowchart 400 of an exemplary process for automated configuration of augmented and virtual reality avatars for user specific behaviors, according to an embodiment. Note that one or more steps, processes, and methods described herein may be omitted, performed in a different sequence, or combined as desired or appropriate.

At step 402 of flowchart 400, a request is received to display an AR or VR environment via a device of a user. The AR or VR environment may correspond to a digital environment where a user may interact with other users, including viewing, interacting with, and/or customizing avatars for use in such environments. Further, the user may have purchased, acquired, and/or generated avatars for use in such digital environments, which may also have customized motions, vocalizations, appearances, and/or other visualizations and presentations.

At step 404, interactions are detected by the user with the AR or VR environment and/or device. These interactions may include real-world interactions and/or virtual interactions within the corresponding digital environment. The interactions may be joining and/or utilizing the digital environment, as well as more subtle interactions, biometrics, sentiments, communications, and the like. At step 406, avatars and preferences for avatar visualizations and/or output are determined for the user in the AR or VR environment. These avatars and preferences for avatar visualizations may be previously established based on those available to the user, and may be purchased, traded, and/or sold on a digital marketplace. The avatar visualizations may include those specified by the user to alter a base action, communication, or appearance of an avatar.

At step 408, parameters for presentation of the avatars in the AR or VR environment are determined. The parameters may correspond to avatar output data that defines the look, appearance, size, scaling, vocalization, motions or actions, and the like. These parameters may be based on the user's behaviors and preferences, as well as the base action, communication, or appearance that the avatar was to take in the corresponding AR or VR environment. Thus, the parameters may define the presentation, visualization, sounds, and the like that the avatar should take for a user-specific presentation of the avatar to the user in the corresponding AR or VR environment.

At step 410, outputs of the avatars for the AR or VR environment are generated using the parameters. These outputs may correspond to the output specific to the corresponding digital environment, and may be adjusted based on the avatar presentation parameters for the specific user and digital environment. At step 412, the AR or VR environment is configured and customized based on the outputs of the avatars. This may include presenting the avatar to the user at a time and/or location within the digital environment to provide the proper output to the user. Further, the AR or VR environment may be specifically customized for the user, and thus appear different to other users, or the user may further share such an environment with other users for viewing of that user's configured avatars.

Figure 5:
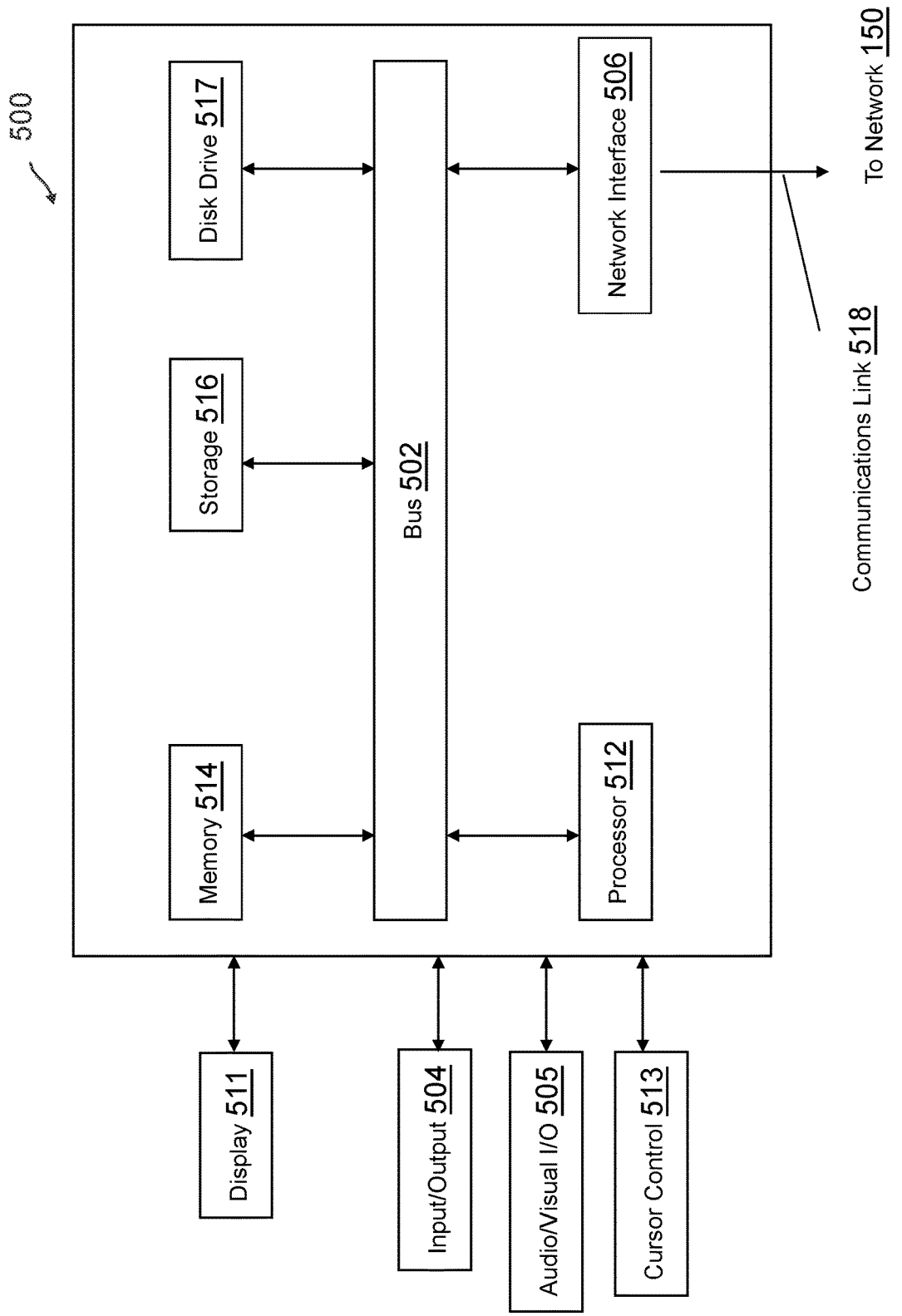
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing system comprising:
    a non-transitory memory; and
    one or more hardware processors coupled to the non-transitory memory and configured to read instructions from the non-transitory memory to cause the computing system to perform operations comprising:
        detecting that a first user is interacting in an augmented reality (AR) environment via a first device of the first user, wherein the detecting includes detecting that the first user is queued in a line associated with the real-world environment of the AR environment;
        determining first user data comprising a preference by the first user for an avatar visualization in the AR environment or an interest of the first user that is associated with the avatar visualization;
        determining, based on the first user data, one or more parameters for a presentation of a first avatar in the AR environment to the first user on the first device;
        generating the first avatar for the AR environment based on the one or more parameters wherein the generating the first avatar comprises generating at least one virtual avatar representation of at least one additional digital user in the line associated with the real-world environment; and
        customizing the AR environment on the first device based on the first avatar and the real-world environment of the AR environment to the first user on the first device.

2. The computing system of claim 1, wherein the operations further comprise:
    customizing the AR environment with a second avatar in the real-world environment, wherein the second avatar is associated with a route guidance operation in the real-world environment; and
    causing the second avatar to provide routing instructions associated with the line or the real-world environment to the first user in the AR environment.

3. The computing system of claim 2, wherein the second avatar is presented based at least on the one or more parameters, and wherein the one or more parameters comprise at least one of an appearance of the first avatar or the second avatar, a voice of the first avatar or the second avatar, or an output action of the first avatar or the second avatar.

4. The computing system of claim 2, wherein the operations further comprise:
    determining a change to the route guidance operation based on a line queue associated with the line or another line corresponding to the real-world environment; and
    updating the second avatar based on the change to the route guidance operation.

5. The computing system of claim 1, wherein the first avatar is further generated based on one or more pre-determined avatar models or one or more pre-generated avatar models, and wherein the one or more pre-determined avatar models or the one or more pre-generated avatar models are available via a marketplace provided in conjunction with the computing system.

6. The computing system of claim 1, wherein the first avatar is further generated for the first user based on a facial image of a first selected person by the first user or a face mashup operation by a machine learning engine.

7. The computing system of claim 1, wherein the operations further comprise:
    generating a second avatar for a second user that has a different appearance and/or a different speech based on a second selected person by the second user.

8. The computing system of claim 1, wherein the operations further comprise:
    configuring the at least one virtual avatar representation to interact with the first avatar of the first user in the AR environment while the first user is queued in the line.

9. A method comprising:
    receiving, by a computer system for avatar management in a digital environment, a request to generate an avatar for an entity in the digital environment presentable to users via computing devices, wherein the receiving the request includes detecting that the entity is queued in a line associated with a real-world environment corresponding to the digital environment;

receiving one or more predefined parameters comprising at least one of an appearance of the avatar in the digital environment, an action for a performance by the avatar in the digital environment, or configurable speech for an output by the avatar in the digital environment;

accessing available avatar model data associated with the request and the one or more predefined parameters; and generating, based on the one or more predefined parameters and the available avatar model data, the avatar associated with the entity for the digital environment, wherein the generating the avatar comprises generating at least one virtual avatar representation of at least one digital user in the line associated with the real-world environment.

10. The method of claim 9, wherein the one or more predefined parameters further comprise a set range or an adjustable variation of the appearance, the action, or the configurable speech based on a user viewing the avatar or the digital environment presented to the user viewing the avatar.

11. The method of claim 9, further comprising:
detecting one of the users interacting with the digital environment using one of the computing devices;
rendering the avatar to the one of the users in the digital environment via the one of the computing devices; and
animating the avatar in the digital environment to the one of the users.

12. The method of claim 11, wherein prior to the rendering, the method further comprises:
determining user interest data for the one of the users, wherein the user interest data comprises a face of interest to the one of the users; and
generating, using a face mashup operation, a facial appearance for the avatar based on the user interest data,
wherein the avatar is rendered with the facial appearance.

13. The method of claim 11, further comprising:
providing a share from the rendering to another user of the avatar or a royalty for the other user viewing the avatar in the digital environment to the entity.

14. The method of claim 11, wherein the detecting, the rendering, and the animating require a consent from the one of the users for the digital environment.

15. The method of claim 9, wherein the digital environment comprises an augmented reality or a virtual reality each having one or more avatars represented with respect to real objects and/or virtual objects in the digital environment, and wherein the computing devices comprise at least one of a mobile smart phone device, a wearable device, a video projector, or a holographic projector.

16. The method of claim 9, wherein the entity comprises a user or a business, and wherein the request to generate the avatar comprises an advertisement generate request for an advertisement associated with the user or the business of the entity.

17. A non-transitory machine-readable medium having stored thereon machine-readable instructions executable to cause a machine to perform operations comprising:
receiving, from a computing device of an entity by a service provider system, avatar data comprising an image, a video, or an animation associated with an avatar presentable in an augmented reality (AR) environment to users;
detecting that the entity is queued in a line associated with a real-world environment corresponding to the AR environment;
determining one or more parameters for avatar presentations as a digital visualization in the AR environment;
generating the avatar for the entity in the AR environment based on the avatar data and the one or more parameters, wherein the generating the avatar comprises generating at least one virtual avatar representation of at least one digital user in the line associated with the real-world environment; and
providing the avatar to the users in the AR environment based on one or more real-world environments for the users in the AR environment.

18. The non-transitory machine-readable medium of claim 17, wherein the providing the avatar to the users comprises:
offering the avatar for purchases or placement uses by the users in the AR environment via a digital marketplace.

19. The non-transitory machine-readable medium of claim 18, wherein the operations further comprise:
receiving a usage request for the avatar from a first user of the users in a user environment for a second user of the users in the AR environment;
processing the usage request on behalf of one of the users for the avatar;
creating a customization of the avatar for the one of the users in the AR environment based on user data for the one of the users; and
causing the customization of the avatar to be presented in the user environment for the one of the users in the AR environment.

20. The non-transitory machine-readable medium of claim 17, wherein the one or more parameters for the avatar presentations comprise at least one of an avatar body type, an avatar face type, one or more avatar costumes for the avatar, or one or more avatar speech outputs by the avatar.

* * * * *